United States Patent
Hasegawa et al.

(10) Patent No.: US 10,719,483 B2
(45) Date of Patent: Jul. 21, 2020

(54) REMOTE COPY WITH DATA DEDUPLICATION FUNCTIONALITY

(71) Applicant: INTERNATIONAL BUSINESS MACHINES CORPORATION, Armonk, NY (US)

(72) Inventors: Tohru Hasegawa, Tokyo (JP); Hiroshi Araki, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 206 days.

(21) Appl. No.: 15/817,603

(22) Filed: Nov. 20, 2017

(65) Prior Publication Data

US 2019/0155921 A1    May 23, 2019

(51) Int. Cl.
*G06F 16/174*    (2019.01)

(52) U.S. Cl.
CPC ................ *G06F 16/1748* (2019.01)

(58) Field of Classification Search
CPC .................................... G06F 16/1748
USPC ........................................ 707/692
See application file for complete search history.

(56) References Cited

U.S. PATENT DOCUMENTS

| 8,380,681 | B2 | 2/2013 | Oltean et al. |
| 8,788,466 | B2 | 7/2014 | Anglin et al. |
| 9,384,206 | B1 | 7/2016 | Bono et al. |
| 9,665,610 | B2 | 5/2017 | Aronovich |
| 2010/0070478 | A1* | 3/2010 | Anglin ............... G06F 11/1453 707/674 |
| 2012/0150826 | A1* | 6/2012 | Vijayan Retnamma ................ G06F 3/067 707/692 |
| 2012/0290801 | A1 | 11/2012 | Hasegawa et al. |
| 2013/0297572 | A1* | 11/2013 | Wilson ............... G06F 16/1748 707/692 |
| 2017/0109364 | A1 | 4/2017 | Hasegawa et al. |
| 2017/0262350 | A1* | 9/2017 | Dornemann ........ G06F 11/1469 |
| 2018/0060348 | A1* | 3/2018 | Power ................ G06F 16/1752 |

FOREIGN PATENT DOCUMENTS

JP    2013182476 A    9/2013

OTHER PUBLICATIONS

Fu et al., "Design Tradeoffs for Data Reduplication Performance in Backup Workloads," Proceedings of the 13th USENIX Conference on File and Storage Technologies (FAST '15), Feb. 16-19, 2015 (15 pages).
"Data Deduplication Overview," https://technet.microsoft.com/en-us/library/hh831602(v=ws.11).aspx, Oct. 13, 2016 (5 pages).

* cited by examiner

*Primary Examiner* — Robert W Beausoliel, Jr.
*Assistant Examiner* — Arthur Ganger
(74) *Attorney, Agent, or Firm* — Griffiths & Seaton PLLC (57) ABSTRACT

A system and method for transferring data stored in a first storage having a deduplication function to a second storage are presented. Deduplication information may be provided for a common data section of first data, stored in the first storage, containing a unique data section and the common data section. The unique section and the deduplication information for the common data section of the first data using a deduplication index may be sent from the first storage to a second storage. The first data may be copied in the second storage based on the deduplication information.

20 Claims, 8 Drawing Sheets

Table:Deduplication Index

|  | Offset | Length | Address |
|---|---|---|---|
| Data 1 | 0 | 1024 | 0 |
|  | 1024 | 4096 | 1024 |
| Data 2 | 0 | 4096 | 1024 |
|  | 4096 | 512 | 5120 |

FIG. 4

Table: Non-Deduplication Index

|  | Offset | Length | Address |
|---|---|---|---|
| Data 1 | 0 | 1024 | 0 |
|  | 1024 | 4096 | 1024 |
| Data 2 | 0 | 4096 | 5632 |
|  | 4096 | 512 | 5120 |

REMOTE COPY WITH DATA DEDUPLICATION FUNCTIONALITY

BACKGROUND OF THE INVENTION

Field of the Invention

The present invention relates in general to computers, and more particularly to transferring data stored in a first storage system having a deduplication functionality to a second storage system without deduplication functionality in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again and forwarded without any change, by locating repeated data and storing only its first occurrence. Subsequent copies are replaced with pointers to the stored occurrence, which significantly reduces the storage requirements if the data is indeed repetitive. As great strides and advances in technologies come to fruition, the greater the need to make progress in these systems advantageous for efficiency in data transfer, retrieval, and storage.

SUMMARY OF THE DESCRIBED EMBODIMENTS

Various embodiments for remote copy with data deduplication functionality are presented. In one embodiment, by way of example only, a method for transferring data stored in a first storage system having a deduplication functionality to a second storage system without deduplication functionality, again by a processor, is provided. Deduplication information may be provided for a common data section of first data, stored in the first storage, containing a unique data section and the common data section. The unique data section and the deduplication information for the common data section of the first data using a deduplication index may be sent from the first storage to a second storage. The first data may be copied in the second storage based on the deduplication information.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

In the field of computer data processing there is increasing demand for ways for organizations to continue doing business to prevent the loss of use of data or processing capability. The technique used in typical disaster recovery solutions is known in the art as "Remote Copy", or sometimes "Peer-to-Peer Remote Copy (PPRC)".

In one aspect, an application writing data to storage may also write that data to remote storage. However, such an operation may consume central processing unit ("CPU") resources and network resources of the host computer on which the application is running. In view of this, the storage itself may be connected to the remote storage, a network, and/or the like to copy data. That is, different copy operations may be used for maintaining remote copies of data at a secondary site such as, for example, IBM Metro Mirror® and Global Copy. Metro Mirror is a synchronous copy process that, when writing occurs from a host computer, the data may be written to a remote storage at the same time. Global Copy is an asynchronous copy process that copies data to remote storage asynchronously when writing from a host computer. A synchronous copy operation may lower the writing performance of the host computer when using remote storage connected through high latency networks. To avoid this problem, an asynchronous copy operation may be used to copy data to remote storage.

In an asynchronous data copy operation, from the time when data writing to a local storage device occurs until the time when the data is completely copied to a remote storage device, data consistency between those storage devices may not be established. In particular, when a large amount of data is written to a local storage device, transferring the data over a network may be extremely time consuming and may result in a lengthy data inconsistency period.

Thus, to avoid such delays, various embodiments provided herein may use a storage having a data deduplication function and only data that will be stored after deduplication and information about the data deduplication are sent to a remote site. In this way, the amount of data to be copied to the remote site may be reduced to shorter times to complete the copying.

It should be noted that data deduplication refers to the reduction and/or elimination of repetitive data. In data deduplication, a data object, which may be a file, a data stream, or some other form of data, is broken down into one or more parts called sub-blocks. In a data deduplication process, duplicate copies of data are reduced or eliminated, leaving a minimal amount of redundant copies, or a single copy of the data, respectively. The reduction of redundant data is known as compression. Deduplication is a special kind of compression, targeting repetitive data. Using deduplication processes provides a variety of benefits, such as reduction of required storage capacity and increased network bandwidth. Due to these and other benefits, deduplication has emerged in recent years as a highly important technological field in computing storage systems.

However, data deduplication may cause one or more challenges because a plurality of files refers to one block and thus concentrated access to those files increases the response time. In view of this, the data deduplication may be intentionally not performed on certain parts or sections of data to be copied. Thus, one or more aspects of the present invention reduces the amount of data to be copied to a remote site without performing data deduplication. Accordingly, even though data deduplication may be used in copying data to a remote site in a short period of time, the present invention provides for intentionally not performing data deduplication to prevent inefficiency and delayed access time to data.

In one aspect, information for data deduplication may be created and maintained, but data deduplication is not actually performed. When data is copied to a remote site, only new or unique part(s) of the data and information for the data deduplication are sent to the remote site. In the storage of the remote site, a copy operation may be performed, except for the unique part(s), for other common data parts by executing a local copy operation based on the data deduplication information.

In an additional aspect, the present invention provides for transferring data stored in a first storage system having a deduplication functionality to a second storage system without deduplication functionality. Deduplication information may be provided for a common data section of first data, stored in the first storage, containing a unique data section and the common data section. The unique section and the deduplication information for the common data section of the first data using a deduplication index may be sent from the first storage to a second storage. The first data may be copied in the second storage based on the deduplication information.

Additionally, the mechanisms of the illustrated embodiments provide for transferring data stored in a first storage having a deduplication function to a second storage. In the first storage, a determination operation may be performed to determine whether data containing a unique data part(s) and common data part(s) is to be deduplicated. In response to determining the data is not to be deduplicated, storing, in the first storage, the data in non-deduplicated form. Deduplication information may be generated and/or created for the common data part(s) of the data even if it is determined that the data is not to be deduplicated. A deduplication index containing the deduplication information may be maintained. Upon receipt of a request for a transfer of data, containing the common part(s) from the first storage to the second storage, the mechanisms of the illustrated embodiments may transmit, from the first storage, a unique data part(s) of the requested data and deduplication information for the common data part(s) using the deduplication index. The mechanisms of the illustrated embodiments may update and maintain, in the first storage, a non-deduplication index for the data to be stored in non-deduplicated form. Upon receipt of a request for reading data containing the common data part(s) in the first storage, a read operation may be performed using the non-deduplication index.

In an additional aspect, the common data part(s) may also be copied to another location in the first storage. In response to the common data part(s) having been copied to the other location in the first storage, the non-deduplication index may be updated. The first storage may store a plurality of pieces of data having data parts. The non-deduplication index may store an offset, a length, and an address for each of the parts of each of the plurality of pieces of data.

The mechanisms of the illustrated embodiments may receive, in the second storage system, the unique part(s) of the received data and deduplication information for the common data part(s). In the second storage system, a determination operation may be performed to determine whether the received data is to be deduplicated. In response to determining the received data is not to be deduplicated, a local copy operation may be performed in the second storage, based on the deduplication information, to create a copy of the common data part(s) of the data. In response to the second storage having received the unique part(s) and deduplication information, the unique data part(s) may be written in the second storage and an element of a non-deduplication index corresponding to the unique part(s) may be updated. A deduplication index may be updated in the second storage system based on the deduplication information. In one aspect, a local copy operation may include 1) reading the common part from an address where the common part has been stored based on the deduplication information, 2) writing the common part(s) as a part of the copy of the data, and/or 3) updating an element of the non-deduplication index corresponding to the part of the copy of the data and the part being the common part(s). Additionally, the second storage system may not have any data deduplication functionality.

As an additional aspect, the present invention provides for transferring data stored in a first storage system, having deduplication functionality, to a second storage system, not having deduplication functionality. For first data that is stored in the first storage and containing a unique data part and a common data part, deduplication information may be provided for the common data part. The unique data part and the deduplication information may be sent from the first storage system to the second storage system. In the second storage, a local copy operation may be performed based on the deduplication information to make a copy of the first data.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
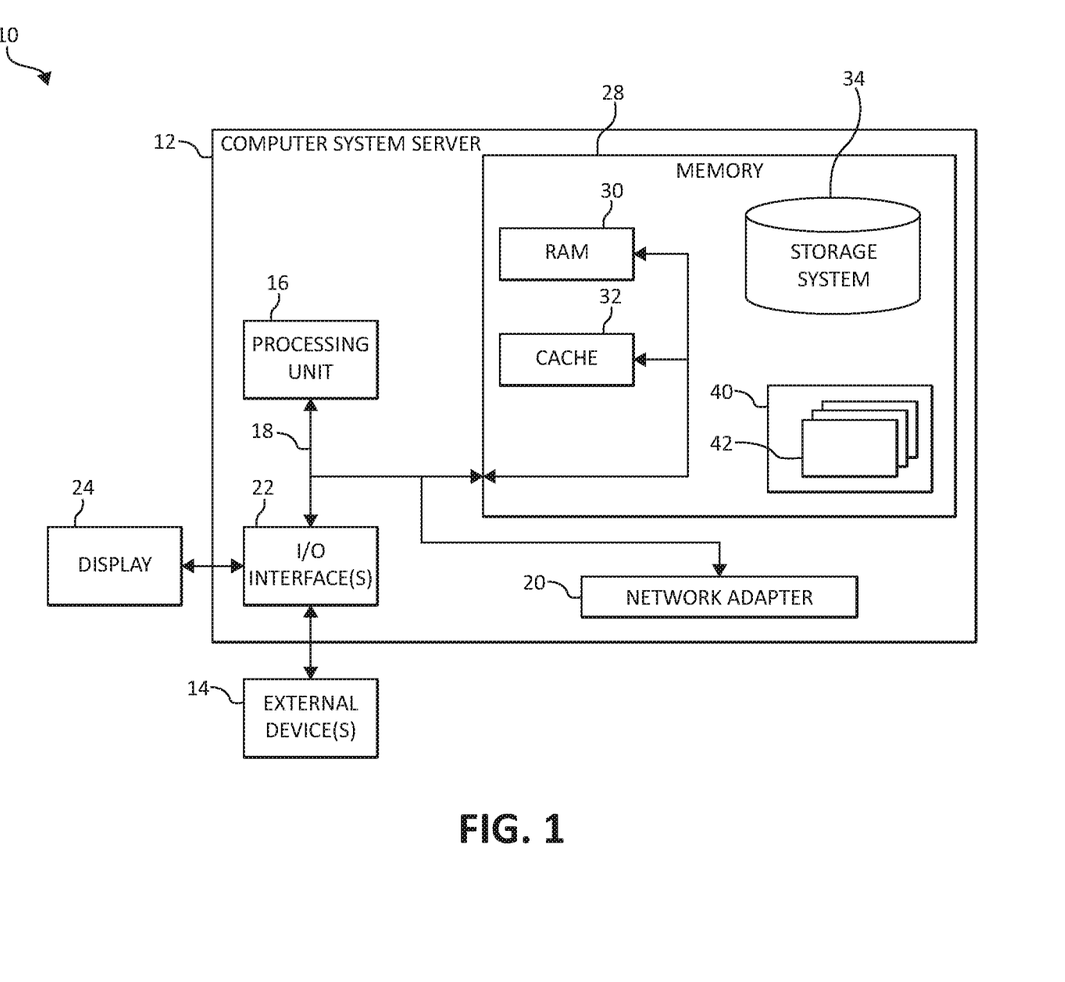
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
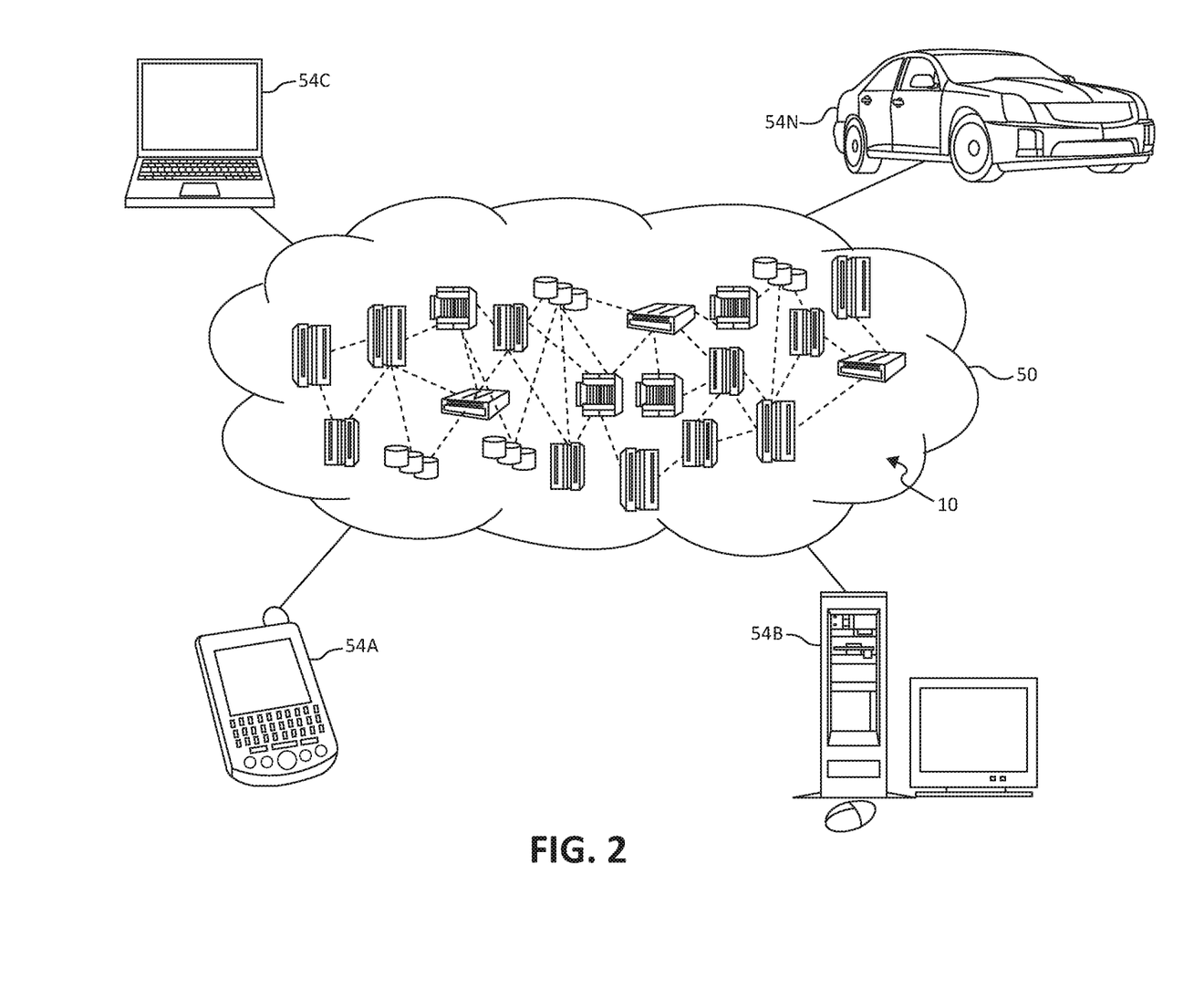
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
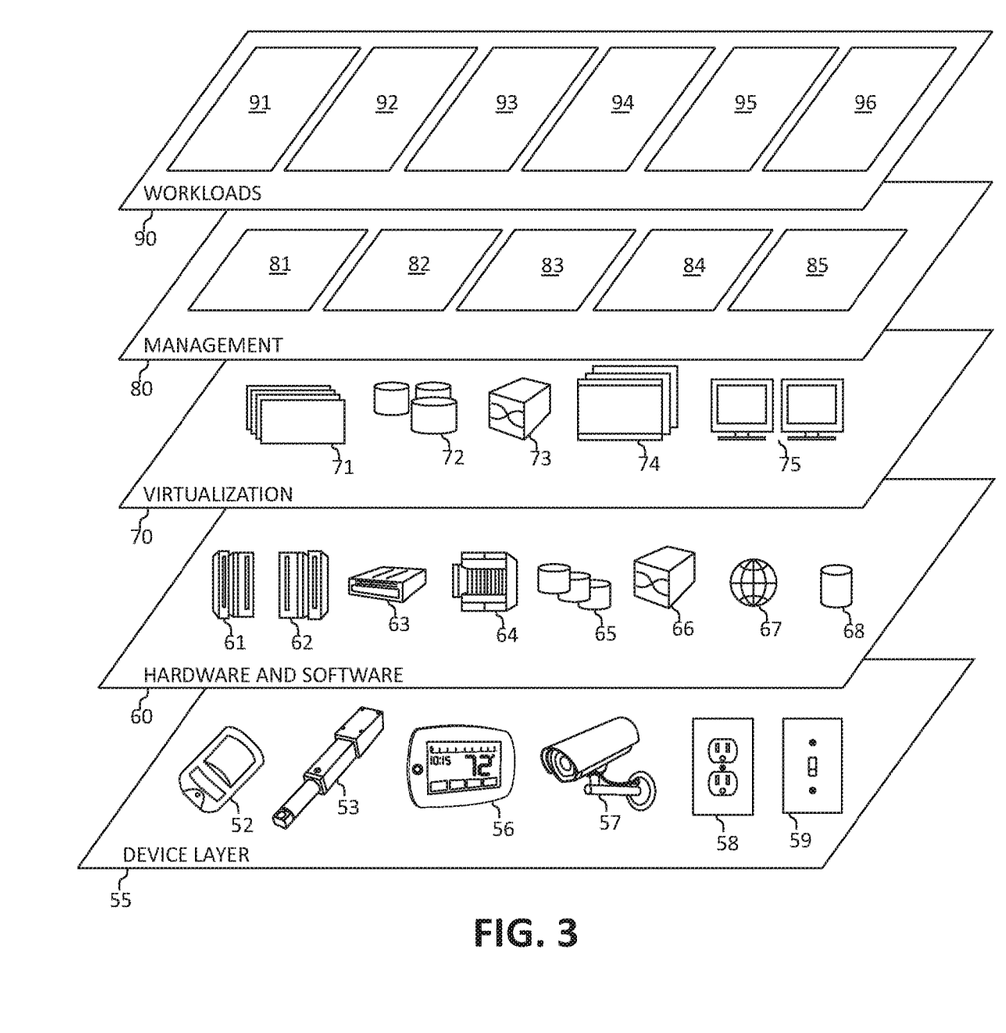
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various remote copy with data deduplication functionality workloads and functions 96. In addition, workloads and functions 96 for remote copy with data deduplication functionality may include such operations as data analytics, data analysis, and as will be further described, notification functionality. One of ordinary skill in the art will appreciate that the workloads and functions 96 for remote copy with data deduplication functionality may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described herein, the present invention provides solutions to provide remote copy with data deduplication functionality whereby data stored in a first storage system having a deduplication functionality may be transferred to a second storage system without deduplication functionality. In other words, the present invention is not directed to the function of data deduplication itself, but provides a remote copy function having a data deduplication function and copying only unique data part(s) of data and data deduplication information to a remote site such as, for example, using a deduplication system (e.g., IBM® ProtecTIER® deduplication system) based on one of a variety of implementation structures used in the deduplication system and how the IBM® ProtecTIER® deduplication system may implement the present invention. Said differently, the present invention extends a storage system having data deduplication functionality and remote copy functionality.

For example, in one embodiment, by way of example only, the present invention enables a storage system, having a data deduplication function, to perform a data deduplication operation on data written to the storage and maintain positional information of unique part(s) of the data that have been actually written to the storage system in performing the data deduplication operation. The positional information is hereafter called a deduplication index (or "DedupIndex"). When the storage system, having a data deduplication function, is requested to write data, the storage system may check if the data contains common data part(s) that have been previously written in the storage system and updates the DedupIndex. Only the unique data part(s) are stored in the storage.

Figure 4:
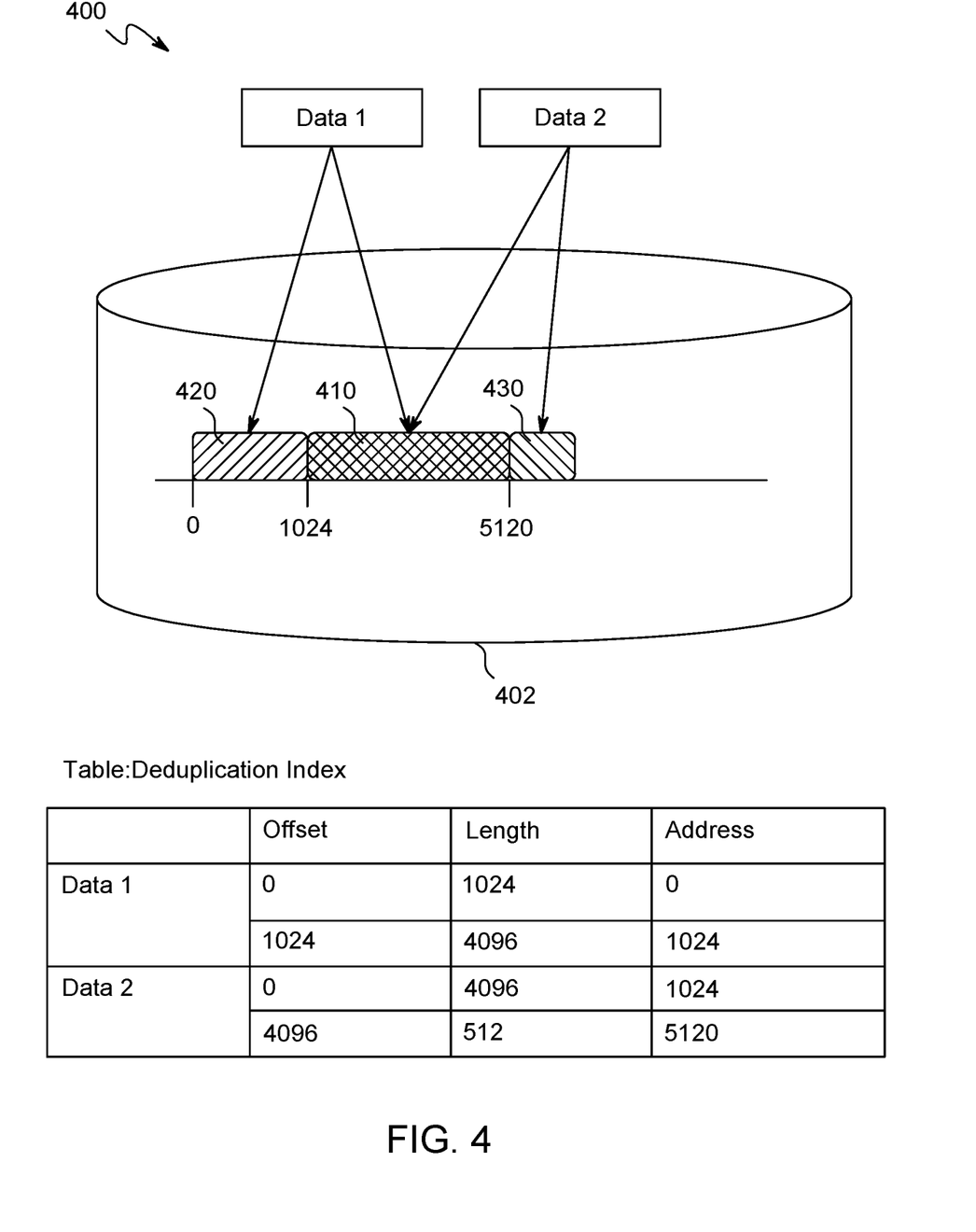
FIG. 4 is a diagram depicting deduplicated storage of data according to an embodiment of the present invention.

Turning now to FIG. 4, a diagram depicting deduplicated storage 400 of data. In one aspect, the operations of functionality 400 of FIG. 4 may be implemented in one or more aspects of FIGS. 1-3 or other storage systems.

Consider now, for example, two pieces of data such as Data 1 and Data 2. Data 1 and Data 2 may have unique data parts 420, 430 and a common data part 410. The DedupIndex maintains storage addresses of the unique data parts 420, 430 and a common data part 410 as shown in Table 1. That is, Table 1 illustrates an example of a DedupIndex and may store the offset of the data, length of the data, and/or an address. Any index information (positional information of data on physical storage) may be maintained by a storage system 402 having a data deduplication function.

Figure 5:
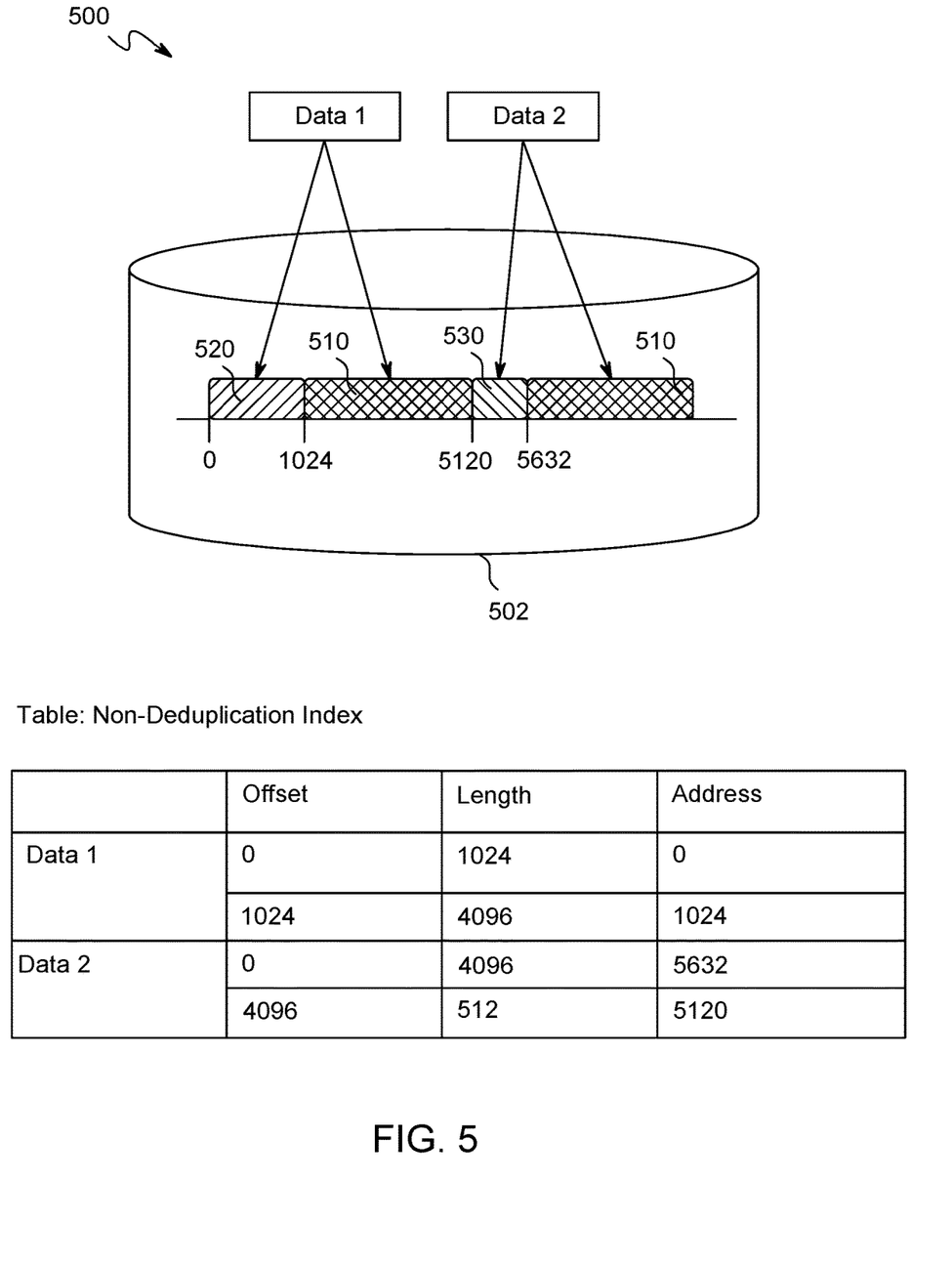
FIG. 5 is an additional diagram depicting non-deduplicated storage of data according to an embodiment of the present invention.

Turning now to FIG. 5, non-deduplicated storage of data is depicted. In one aspect, the operations of functionality 500 of FIG. 5 may be implemented in one or more aspects of FIGS. 1-3 or other storage systems. In one aspect, the present invention may write data to the storage system having a data deduplication function without actually performing a data deduplication operation. The positional information of data parts may be written in the storage system. This positional information is hereinafter called a non-deduplication index ("NonDedupIndex"), as illustrated in FIG. 5 as Table 2. The NonDedupIndex may be the same as the positional information maintained by a storage system that does not have data deduplication functionality.

More specifically, turning now to Data 1 and Data 2 of FIG. 5 (see also FIG. 4) after updating the DedupIndex, the common data part 410 may be stored in separate locations, as illustrated in FIG. 5 as common data part 510. Data 1 and Data 2 may also have unique data parts 520, 530 respectively. In this operation, the NonDedupIndex may also be updated, as shown in Table 2. Table 2 illustrates an example of a NonDedupIndex and may store the offset of the data, length of the data, and/or an address. As a result, data parts of Data 1 and Data 2 may be stored such that some of the addresses of Data 1 and Data 2 are not duplicated (e.g., Data 1 and Data 2 do not have the same address in the non-deduplication index). Any index information (positional information of data on physical storage) may be maintained by the storage system 502, which does not have data deduplication functionality.

Figure 6:
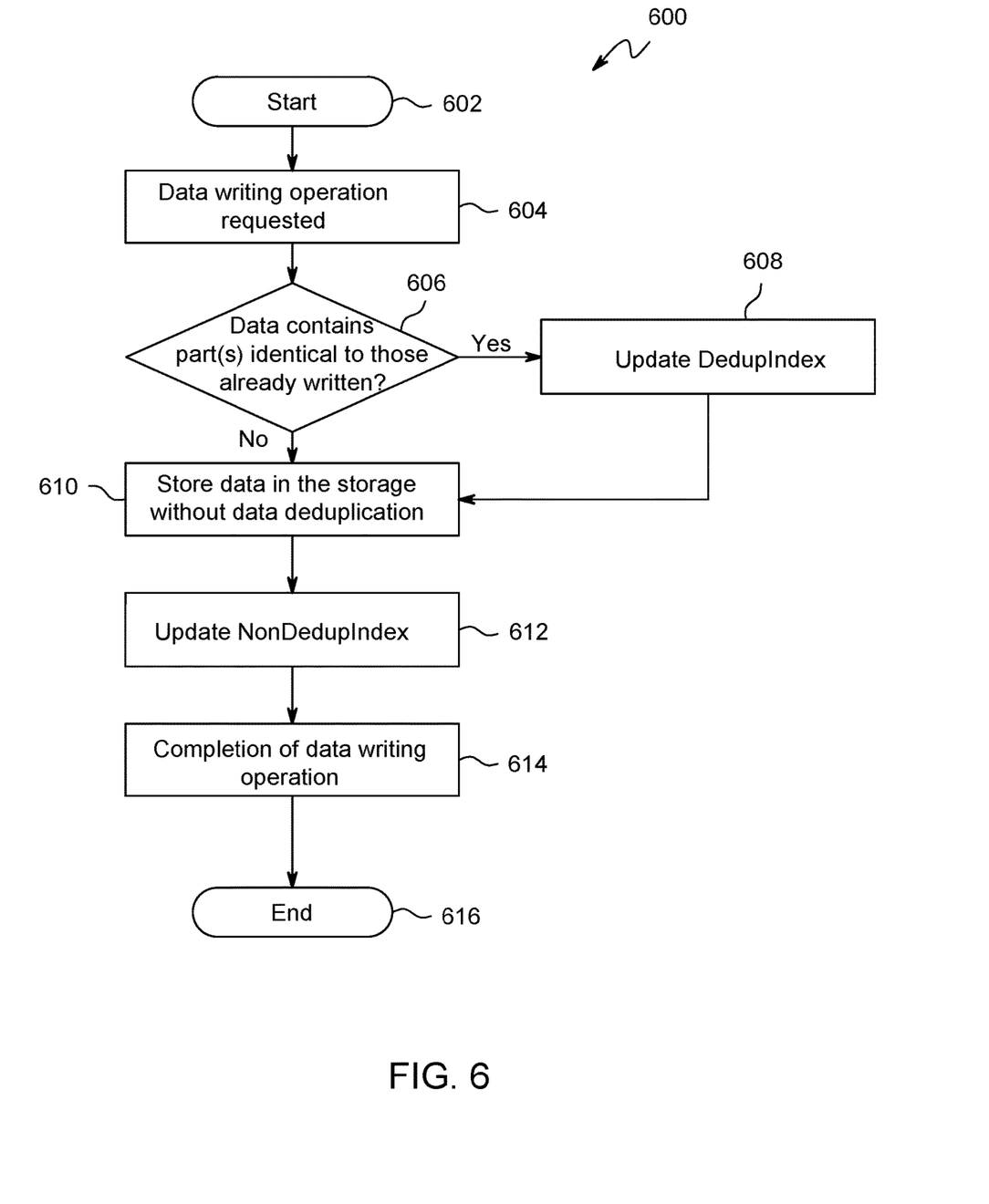
FIG. 6 is a flowchart diagram depicting an additional exemplary method for transferring data stored in a first storage system having a deduplication functionality to a second storage system without deduplication functionality and a communication tool by a processor, again in which aspects of the present invention may be realized.

Turning now to FIG. 6, a method 600 for transferring data stored in a first storage system having a deduplication functionality to a second storage system without deduplication functionality by a processor, again in which aspects of the present invention may be realized. That is, FIG. 6 depicts an operation flow for writing data to a storage system. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-4 may be implemented all and/or in part in FIG. 6.

The functionality 600 may start in block 602. A data writing operation ("write data") may be requested, as in block 604. A determination operation may be performed to determine whether the data contains data (e.g., data parts or section) that may be identical to data that has already been written (to storage), as in block 606. From block 606, if the data contains data identical to data that has already been written, a deduplication index may be updated (to indicate the data contains identical data already written), as in block 608, and then move to block 610. Alternatively, if the data contains data that is not identical to data that has already been written, the data may be stored in storage without data deduplication being performed, as in block 610. A non-deduplication index may be updated (which may indicate the data has been stored without deduplication in a storage system), as in block 612. The data writing operation ("write data") may be completed, as in block 614. The functionality 600 may end, as in block 616.

It should be noted that when checking if the data, which is to be written, contains common data part(s) that have been previously written in a storage system, one or more functions of the storage system, having data deduplication functionality, may be utilized. When a reading operation is requested to the storage system, the storage system may respond to the request in the same manner as that of a storage system, which does not have data deduplication functionality, based on the NonDedupIndex (see Table 2 of FIG. 5), without referring to the DedupIndex (see Table 1 of FIG. 4).

When copying data to a remote site, the storage system may perform a copy operation as follows. First, the storage system, acting as a source storage or "primary storage" system, operates in the same manner as that of a storage system having data deduplication functionality. That is, a variety of methods or operations may be employed for taking a snapshot necessary for an asynchronous copy operation and for saving histories of writing operations. In particular, information that is intended to be transferred for the data copy operation may be composed of data deduplication information and unique data part(s) of the data. The copy destination storage (e.g., a remote storage system or secondary storage system) may receive the data deduplication information and unique data part(s) and may write only the unique data part(s). The copy destination storage may update a DedupIndex and a NonDedupIndex, as illustrated in FIG. 7.

Figure 7:
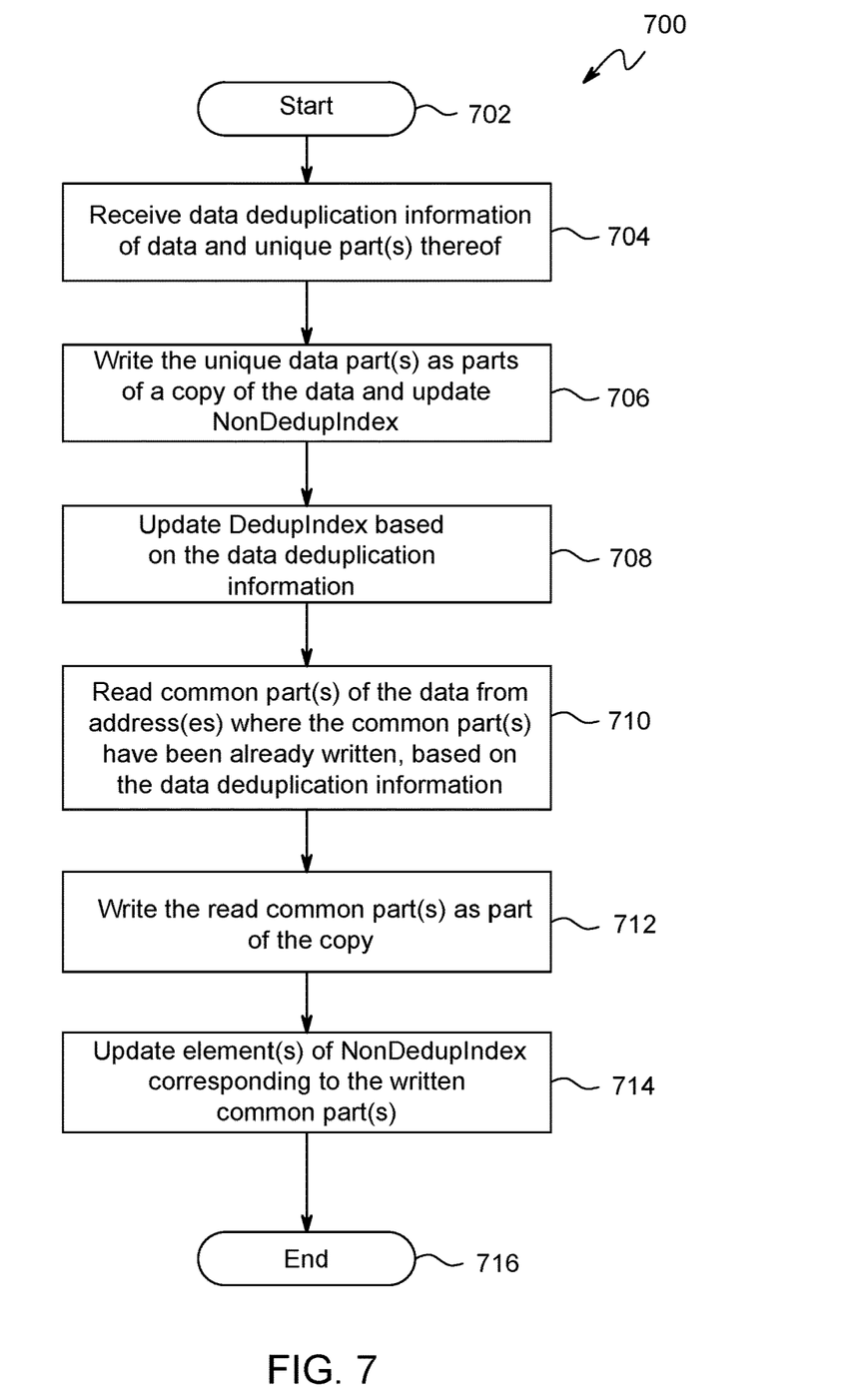
FIG. 7 is a flowchart diagram depicting an additional exemplary method for transferring data stored in a first storage system to a second storage system by a processor, again in which aspects of the present invention may be realized.

Turning now to FIG. 7, a method 700 for transferring data stored in a first storage system to a second storage system by a processor, again in which aspects of the present invention may be realized. That is, FIG. 7 depicts an operation flow of receiving data for copying the data into a destination storage system. The functionality 700 may be implemented as a method executed as instructions on a machine, where the instructions are included on at least one computer readable medium or one non-transitory machine-readable storage medium. In one aspect, the functionality, operations, and/or architectural designs of FIGS. 1-4 may be implemented all and/or in part in FIG. 7.

The functionality 700 may start in block 702. Data deduplication information of data having unique data parts/sections may be received, as in block 704. The unique data parts/sections may be written as parts/sections of a copy of the data and a non-deduplication index may be updated, as in block 706. A deduplication index may be updated based on the data deduplication information, as in block 708. One or more common data parts (or sections) of the data may be read from one or more addresses where the more common data parts have been previously written based on the deduplication information, as in block 710. The read common data parts may be written as part of copying the data, as in block 712. One or more elements of the non-deduplication index may be updated corresponding to the written common data parts, as in block 714. The functionality 700 may end, as in block 716.

It should be noted that although only the data deduplication information and unique data part(s) are transferred to the copy destination storage, the copy destination storage may be allowed to write data in the same manner as that of a storage system that does not have data deduplication functionality. Thus, the present invention achieves each of the following: 1) the copy source storage and the copy destination storage do not both perform data deduplication thus avoiding a decrease in the response speed due to data deduplication, and 2) the data to be transferred to a remote site for remote copy may be reduced to only the same information as that transferred by storage having a data deduplication function.

Figure 8:
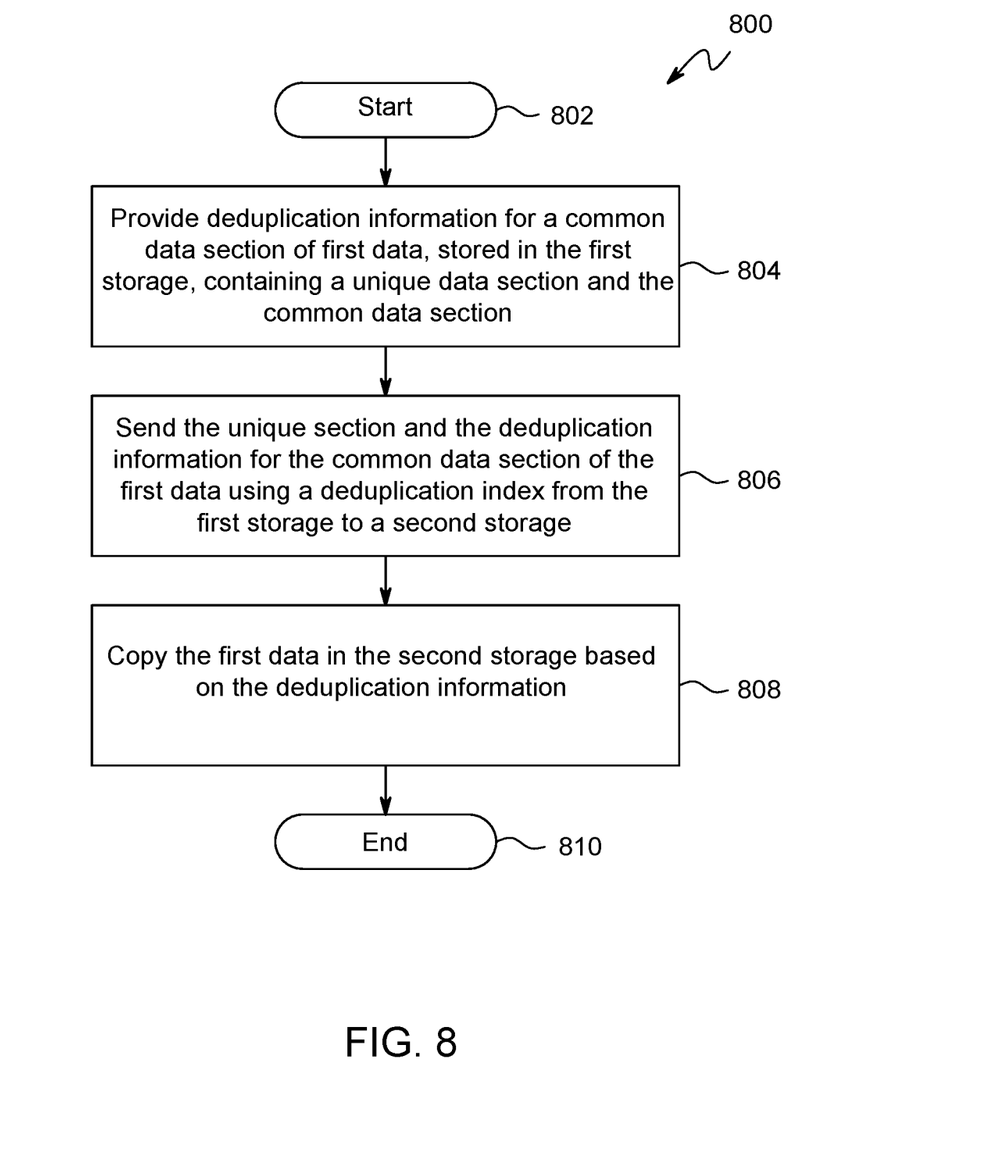
FIG. 8 is a flowchart diagram depicting an additional exemplary method for transferring data stored in a first storage system having a deduplication functionality to a second storage system without deduplication functionality by a processor, again in which aspects of the present invention may be realized.

Turning now to FIG. 8, a method 800 for transferring data stored in a first storage having a deduplication function to a second storage using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. In one aspect, the functionality, operations, and/or architectural designs of FIGS. 1-4 may be implemented all and/or in part in FIG. 8.

The functionality 800 may start in block 802. Deduplication information may be provided for a common data section of first data, stored in the first storage, containing a unique data section and the common data section, as in block 804. The unique section and the deduplication information for the common data section of the first data using a deduplication index may be sent from the first storage to a second storage, as in block 806. The first data may be copied in the second storage based on the deduplication information, as in block 808. In one aspect, the second storage lacks data deduplication functionality. The functionality 800 may end, as in block 810.

In one aspect, in conjunction with and/or as part of at least one block of FIG. 8, the operations of method 800 may include each of the following. The operations of method 800 may determine, in the first storage, whether the first data containing the unique data section and the common data section is to be deduplicated. The operations of method 800 may maintain a deduplication index containing the deduplication information, and/or maintain a non-deduplication index in the first storage containing the deduplication information. The common data part may be copied to an alternative location in the first storage. The non-deduplication index may be updated in response to copying the common data part to the alternative location.

The operations of method 800 may receive, in the second storage, the unique data part of the received data and deduplication information for the common data part; determine, in the first storage, whether the first data is to be deduplicated; and/or execute, in the second storage, a local copy operation of the first data based on the deduplication information to make a copy of the common data part of the first data in response to determining the first data is not to be deduplicated.

The operations of method 800 may write, in the second storage, the unique data part and update an element of a non-deduplication corresponding to the unique part in response to the second storage having received the unique part and deduplication information; and/or update a deduplication index based on the deduplication information in the second storage.

Additionally, the operations of method 800 may read the common data part from an address where the common data part has been stored based on the deduplication information; write the common data part in the second storage as a part of copying the first data; and/or update the non-deduplication index corresponding to the common data part of the copy of the first data, wherein the common data part is the read common data part.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for remote data copy using a processor device in a computing environment, the method comprising:
    providing deduplication information for a common data section of first data, stored in a first storage comprising a first storage system having data deduplication functionality, containing a unique data section and the common data section;
    sending the unique section and the deduplication information for the common data section of the first data using a deduplication index from the first storage to a second storage comprising a second storage system not having the data deduplication functionality; and
    copying the first data in the second storage based on the deduplication information.

2. The method of claim 1, further including determining, in the first storage, whether the first data containing the unique data section and the common data section is to be deduplicated.

3. The method of claim 1, further including:
    maintaining a deduplication index containing the deduplication information; and
    maintaining a non-deduplication index in the first storage containing the deduplication information.

4. The method of claim 3, further including:
    copying the common data part to an alternative location in the first storage; and
    updating the non-deduplication index in response to copying the common data part to the alternative location.

5. The method of claim 3, further including:
    receiving, in the second storage, the unique data part of the received data and deduplication information for the common data part;
    determining, in the first storage, whether the first data is to be deduplicated; and
    executing, in the second storage, a local copy operation of the first data based on the deduplication information to make a copy of the common data part of the first data in response to determining the first data is not to be deduplicated.

6. The method of claim 1, further including:
    writing, in the second storage, the unique data part and updating an element of a non-deduplication corresponding to the unique part in response to the second storage having received the unique part and deduplication information; and
    updating a deduplication index based on the deduplication information in the second storage.

7. The method of claim 1, wherein copying the first data further includes:
    reading the common data part from an address where the common data part has been stored based on the deduplication information;
    writing the common data part in the second storage as a part of copying the first data; and
    updating the non-deduplication index corresponding to the common data part of the copy of the first data, wherein the common data part is the read common data part.

8. A system for remote data copy, comprising:
    one or more computers with executable instructions that when executed cause the system to:
        provide deduplication information for a common data section of first data, stored in a first storage comprising a first storage system having data deduplication functionality, containing a unique data section and the common data section;
        send the unique section and the deduplication information for the common data section of the first data using a deduplication index from the first storage to a second storage comprising a second storage system not having the data deduplication functionality; and
        copy the first data in the second storage based on the deduplication information.

9. The system of claim 8, wherein the executable instructions further determine, in the first storage, whether the first data containing the unique data section and the common data section is to be deduplicated.

10. The system of claim 8, wherein the executable instructions further:
    maintain a deduplication index containing the deduplication information; and
    maintain a non-deduplication index in the first storage containing the deduplication information.

11. The system of claim 8, wherein the executable instructions further:
    copy the common data part to an alternative location in the first storage; and
    update the non-deduplication index in response to copying the common data part to the alternative location.

12. The system of claim 8, wherein the executable instructions further:
    receive, in the second storage, the unique data part of the received data and deduplication information for the common data part;
    determine, in the first storage, whether the first data is to be deduplicated; and
    execute, in the second storage, a local copy operation of the first data based on the deduplication information to make a copy of the common data part of the first data in response to determining the first data is not to be deduplicated.

13. The system of claim 8, wherein the executable instructions further:
    write, in the second storage, the unique data part and update an element of a non-deduplication corresponding to the unique part in response to the second storage having received the unique part and deduplication information; and
    update a deduplication index based on the deduplication information in the second storage.

14. The system of claim 8, wherein the executable instructions further:
    read the common data part from an address where the common data part has been stored based on the deduplication information;
    write the common data part in the second storage as a part of copying the first data; and
    update the non-deduplication index corresponding to the common data part of the copy of the first data, wherein the common data part is the read common data part.

15. A computer program product for, by a processor, remote data copy, the computer program product comprising a non-transitory computer-readable storage medium having computer-readable program code portions stored therein, the computer-readable program code portions comprising:
    an executable portion that provides deduplication information for a common data section of first data, stored in a first storage comprising a first storage system having data deduplication functionality, containing a unique data section and the common data section;

an executable portion that sends the unique section and the deduplication information for the common data section of the first data using a deduplication index from the first storage to a second storage comprising a second storage system not having the data deduplication functionality; and an executable portion that copies the first data in the second storage based on the deduplication information.

16. The computer program product of claim 15, further including an executable portion that determines, in the first storage, whether the first data containing the unique data section and the common data section is to be deduplicated.

17. The computer program product of claim 15, further including an executable portion that:

maintains a deduplication index containing the deduplication information; and maintains a non-deduplication index in the first storage containing the deduplication information;

copies the common data part to an alternative location in the first storage; and updates the non-deduplication index in response to copying the common data part to the alternative location.

18. The computer program product of claim 15, further including an executable portion that:

receives, in the second storage, the unique data part of the received data and deduplication information for the common data part;

determines, in the first storage, whether the first data is to be deduplicated; and executes, in the second storage, a local copy operation of the first data based on the deduplication information to make a copy of the common data part of the first data in response to determining the first data is not to be deduplicated.

19. The computer program product of claim 15, further including an executable portion that:

writes, in the second storage, the unique data part and updates an element of a non-deduplication corresponding to the unique part in response to the second storage having received the unique part and deduplication information; and updates a deduplication index based on the deduplication information in the second storage.

20. The computer program product of claim 15, further including an executable portion that:

reads the common data part from an address where the common data part has been stored based on the deduplication information;

writes the common data part in the second storage as a part of copying the first data; and updates the non-deduplication index corresponding to the common data part of the copy of the first data, wherein the common data part is the read common data part.

* * * * *